United States Patent [19]

Binau et al.

[11] 4,283,254
[45] Aug. 11, 1981

[54] METHYLAMINES PURIFICATION BY DISTILLATION AND PURGE

[75] Inventors: Douglas E. Binau, Charleston; Emmett J. Speicher, Elkview, both of W. Va.

[73] Assignee: E. I. Du Pont de Nemours and Company, Wilmington, Del.

[21] Appl. No.: 136,998

[22] Filed: Apr. 3, 1980

[51] Int. Cl.³ .................... B01D 3/14; C07C 85/26
[52] U.S. Cl. .................................... 203/4; 203/43; 203/DIG. 19; 564/497
[58] Field of Search .............. 564/497; 203/4, 39, 203/43, 95, 99, DIG. 19, 33, 36, 37, 53, 14

[56] References Cited

U.S. PATENT DOCUMENTS

| | | | |
|---|---|---|---|
| 2,180,006 | 11/1939 | Hasche et al. | 564/497 |
| 3,304,253 | 2/1967 | Lewis | 203/43 |
| 3,406,100 | 10/1968 | Karafian | 203/99 |
| 3,445,347 | 5/1969 | Borrel et al. | 203/DIG. 19 |
| 3,692,636 | 9/1972 | Huguet | 203/99 |
| 3,738,915 | 6/1973 | DiFiore et al. | 203/99 |
| 3,850,760 | 11/1974 | Lenel et al. | 203/99 |

FOREIGN PATENT DOCUMENTS 134518 3/1979 Fed. Rep. of Germany ........... 564/479

*Primary Examiner*—Wilbur L. Bascomb, Jr.

[57] ABSTRACT

An improvement in the distillative refining of methylamines containing higher amine impurities wherein the higher amines accumulate in the distillation column, tending to cause flooding and product contamination. The improvement involves purging the column at the point the impurities concentrate, mixing the purge with water to form two phases, separating the phases and recycling the water phase for recovery of its methylamines content.

5 Claims, 1 Drawing Figure

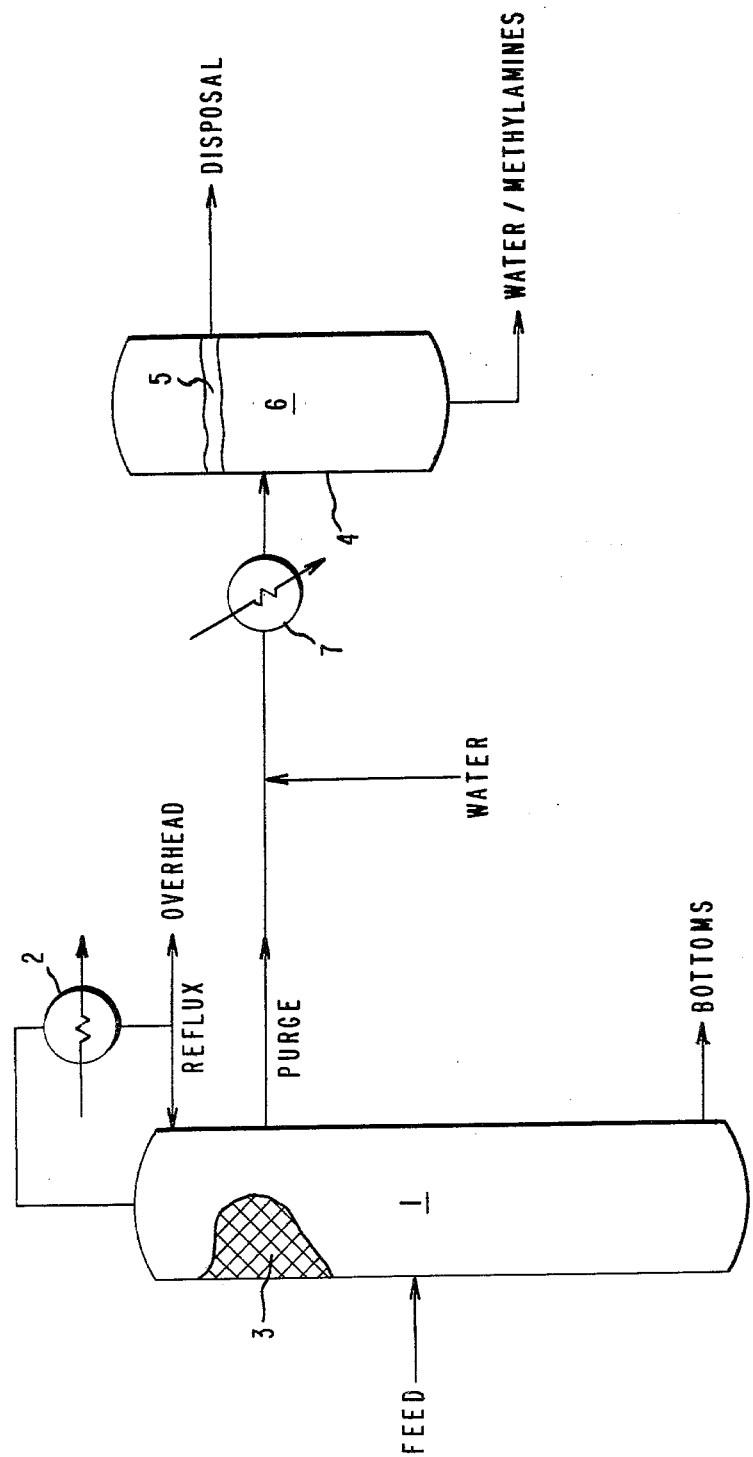

METHYLAMINES PURIFICATION BY DISTILLATION AND PURGE

DESCRIPTION

1. Background of the Invention

Methylamines are conventionally produced by the silica-alumina catalyzed reaction of methanol and ammonia at temperatures of 350°–450° C. and pressures of 200–350 psig. The reaction produces an equilibrium distribution of ammonia, trimethylamine, monomethylamine, dimethylamine, water, methanol and higher amine impurities. The methylamines are separated by distillation; and the unreacted ammonia, methanol and some methylamines are recycled to the reactor. By-product water is usually purged from the system.

The distillation of the crude product can be quite complex, depending upon the product mix desired. In most operations the ammonia is first separated by distillation under pressure. Thereafter, the methylamines are separated from each other and the water and methanol in additional distillation columns.

During the distillation of the methylamines, the higher amine impurities tend to become trapped in the refining train, usually in a column that takes a methylamine overhead and has a water-rich phase at the base. In such a column the higher amines accumulate in some regions of the column and when their concentration becomes high enough to restrict vapor-liquid traffic, the column floods, resulting in contamination of the distilled product.

2. Disclosure of the Invention

The process for distillation of methylamines containing higher amine impurities can be improved by:

(i) purging a distillation column at an area where the impurities concentrate at a rate sufficient to maintain the impurities level below the flooding or upset concentration, (ii) mixing the purge with water or salt water to promote two phases such that the methylamines content of the resulting water layer does not exceed 25% by weight, (iii) separating the water layer from the water-immiscible higher amines layer, and (iv) recycling the water layer to the process for recovery of its methylamines content.

This process results in substantial reduction or even elimination of process upset and product contamination caused by column flooding with purge flows less than about 2% of the total feed to the column. In operating the process the yield loss can be held to less than 0.1%, therefore providing a corresponding reduction in environmental disposal problems.

DESCRIPTION OF THE DRAWING

The FIGURE is a flow sheet of the process of the invention.

DETAILED DESCRIPTION OF THE INVENTION

In the production of methylamines trace impurities are also manufactured. These impurities are predominantly higher amines and include higher alkylamines and diamines, alkyl-substituted pyridines and pyrsoles, and aliphatic amides.

The impurities have physical properties that cause them to trap or accumulate in various columns in the refining train. This accumulation can occur in several regions of a column that has a methylamines overhead and a water-rich phase at the base. By methylamines it is meant any of monomethylamine (MMA), dimethylamine (DMA) or trimethylamine (TMA) or their mixtures.

When the impurities accumulate to a sufficient extent to restrict vapor-liquid traffic within the column, the column will flood. This flooding causes a process upset and product contamination.

The process of the invention will be described in reference to the FIGURE.

Into a distillation column 1 containing the appropriate number of trays is fed a crude methylamine stream. In this column the crude methylamine stream is distilled under pressure, e.g., 150 psig, to produce a water-rich bottom phase and a methylamine overhead. The overhead is condensed 2 and part fed back into the column as reflux and the remainder taken off for further refining or storage or recycle to synthesis.

At some area 3 in the column, the concentration of the higher amine impurities is at or near its maximum. This area can be determined by tray-to-tray analysis of the column composition, and a purge will preferably be taken from the area of the column having the highest impurity concentration. In some embodiments there will be several areas in the column where the impurities concentrate; in such cases the purge can be taken from more than one area.

The purge will be removed from the column at a rate sufficient to maintain the impurities level in the column below the flooding concentration. This rate can be determined by experience or analysis of the purge. In most embodiments the total purge can range from 0.1-5% of the feed to the column. It is desirable to have the purge rate as small as possible, and rates of less than 2% of the feed flow are preferred.

Water is then mixed with the purge to promote two liquid phases, a light phase containing the impurities and a heavier water phase that contains the methylamines. The amount of water added to the purge should be controlled so that the methylamines content of the water does not exceed 25% by weight. The process can be operated at concentrations as low as 1% by weight, but the preferred range will be between 10–20% and, the most preferred, 15% by weight. The light phase will contain around 80% by weight impurities.

In many cases the solubility of organic impurities in the water phase can be decreased if water-soluble inorganic bases and salts are added to the water. Preferred for use are bases such as the alkali and alkaline earth metal oxides and hydroxides, e.g., $Na_2O$, $NaOH$, $BaO$, $Ba(OH)_2$; neutral salts, e.g., $NaCl$, $KCl$, $Na_2SO_4$; and basic salts such as $Na_2CO_3$, $Na_3PO_4$ and $Na_2B_4O_7$. The amount of salt or base added is not critical, and the maximum amount added is that necessary to form a three-phase system, i.e., three liquid or two liquid and one solid phase.

The water-purge mixture is then cooled to a temperature below the boiling point of any of the impurities and aqueous methylamines present in a cooler 7; at atmospheric pressure this is about 20°–40° C. This cooling is desired to avoid flashing of the methylamines from the water phase during separation and to reduce the solubility of the impurities in the water phase. The higher the temperature, the more likely the methylamines will flash; and the higher the methylamines concentration in the water phase, again it is more likely that flashing will occur. At atmospheric pressure the preferred temperature is about 30° C. and the preferred concentration of methylamines is about 15% by weight.

The cooled water-purge mixture is fed into a decanter 4 or other liquid-liquid phase separator where the two phases are formed. The light phase 5 containing about 80% impurities, i.e., the higher boiling amines, is then removed from the decanter for disposal or other use. The water phase 6 containing the methylamines is recycled to the distillation train for recovery of the methylamines.

The process permits the continuous removal of impurities to maintain column stability and product quality with a minimum yield loss. The addition of water or water with base or salt promotes the formation of the two phases, and 50–80% of the impurities present are removed.

EXAMPLES

The following Examples are offered to illustrate the invention.

EXAMPLE 1

One hundred parts of purge (43% water, 49.4% methylamines, 7.6% impurities) are mixed with 265 parts of water and cooled to 25° C. The resulting two-phase system is decanted. The upper liquid phase, 5.2 parts, analyzed: 0.7% $H_2O$, 10.6% methylamines and 88.7% impurities. The lower liquid phase, 359.8 parts, analyzed: 85.6% $H_2O$, 13.6% methylamines and 0.8% impurities.

EXAMPLE 2

One hundred parts of purge (49.9% $H_2O$, 45.7% methylamines, 4.4% impurities) are mixed with 300 parts of 5% NaOH in water and cooled to 25° C. The resulting two-phase system is decanted. The upper liquid phase, 2.6 parts, analyzed: 0.9% $H_2O$, 8.4% methylamines and 90.7% impurities. The lower liquid phase, 397.4 parts, analyzed: 3.8% NaOH, 84.3% $H_2O$, 11.4% methylamines and 0.5% impurities.

We claim:

1. In the process of distilling crude methylamines by feeding crude methylamines into a distillation column wherein methylamines are taken off overhead and a water-rich phase is taken off as bottoms, the improvement comprising
    (i) taking a purge from an area in the column where the impurities concentrate, the purge rate being sufficient to avoid a flooding concentration of impurities in the column;
    (ii) adding water to the purge creating a water-immiscible phase containing impurities and a water phase containing methylamines, the amount of water added being sufficient to keep the methylamines content of the water phase below 25% by weight;
    (iii) cooling the phases to a temperature below the boiling point of the impurities and aqueous methylamines;
    (iv) separating the two phases; and
    (v) recycling the water phase for recovery of its methylamines content.

2. The process of claim 1 wherein the water added to the purge contains a water-soluble inorganic base or salt.

3. The process of claim 2 wherein the base or salt is selected from $Na_2O$, NaOH, BaO, $Ba(OH)_2$, NaCl, KCl, $Na_2SO_4$, $Na_2CO_3$, $Na_3PO_4$ or $Na_2B_4O_7$.

4. The process of claim 1 or claim 2 where the separation of step (iv) is conducted in a decanter.

5. The process of claim 1 wherein the amount of water added maintains the methylamines content of the water phase below 15% by weight.

* * * * *